US008268431B2

(12) United States Patent
Gao et al.

(10) Patent No.: US 8,268,431 B2
(45) Date of Patent: Sep. 18, 2012

(54) APPARENTLY SEAMLESS LENGTHENED BAMBOO SECTION MATERIAL AND A METHOD THEREOF

(75) Inventors: Yonghui Gao, Shanghai (CA); Shiqing Gao, Shanghai (CN); Shibin Gao, Shanghai (CN)

(73) Assignee: Shanghai Yunsheng Bamboo and Wood Product Co., Ltd., Shanghai (CN)

( * ) Notice: Subject to any disclaimer, the term of this patent is extended or adjusted under 35 U.S.C. 154(b) by 194 days.

(21) Appl. No.: 12/449,754

(22) PCT Filed: Aug. 1, 2008

(86) PCT No.: PCT/CN2008/071847

§ 371 (c)(1), (2), (4) Date: Aug. 24, 2009

(87) PCT Pub. No.: WO2009/030132

PCT Pub. Date: Mar. 12, 2009

(65) Prior Publication Data

US 2010/0151175 A1 Jun. 17, 2010

(30) Foreign Application Priority Data

Sep. 7, 2007 (CN) .......................... 2007 1 0045737
Jun. 6, 2008 (CN) .......................... 2008 1 0038705

(51) Int. Cl.
*B32B 3/06* (2006.01)
*B32B 38/00* (2006.01)

(52) U.S. Cl. ................. 428/58; 52/177; 52/314; 428/52

(58) Field of Classification Search .................... 428/58, 428/52; 52/177, 483

See application file for complete search history.

(56) References Cited

U.S. PATENT DOCUMENTS 5,113,632 A * 5/1992 Hanson .......................... 52/385
6,006,486 A 12/1999 Moriau et al.

(Continued)

FOREIGN PATENT DOCUMENTS

CN 2417008 1/2001

(Continued)

OTHER PUBLICATIONS

International Search Report (9 pages).

(Continued)

*Primary Examiner* — Brent Ohern

(57) ABSTRACT

An apparently seamless lengthened bamboo sheet is formed by lengthening a plurality of bamboo strips or blanks and assembling a plurality of lengthened bamboo strips or blanks together. A slot is formed on at least one end of the bamboo strips or blanks in direction of length, and a tenon corresponding to the slot is formed on the same end; the tenon on one bamboo strip or blank is embedded into the slot on another bamboo strip or blank. The tenon and slot are mutually matched and the two bamboo strips or blanks are engaged to each other. A method to manufacture is the apparently seamless lengthened bamboo sheet includes: forming a slot and a tenon on the end of bamboo strips or blanks; embedding a tenon at one end of one bamboo strip or blank into a slot on one end of another bamboo strip or blank; assembling and gluing a plurality of lengthened bamboo strips or blanks in direction of width or thickness; forming the bamboo sheet by a common process including pressing. The slot-tenon connecting structure of the present invention makes the seams on the surface unobvious and enhances the connection strength.

18 Claims, 7 Drawing Sheets

U.S. PATENT DOCUMENTS

| | | | | |
|---|---|---|---|---|
| 2002/0152701 | A1 * | 10/2002 | Zhang et al. | 52/390 |
| 2006/0179733 | A1 * | 8/2006 | Padmanabhan | 52/177 |

FOREIGN PATENT DOCUMENTS

| | | |
|---|---|---|
| CN | 2535489 | 2/2003 |
| CN | 2677115 | 2/2005 |
| CN | 1657244 | 8/2005 |
| CN | 1672884 | 9/2005 |

OTHER PUBLICATIONS

English language abstract of CN 2535489 (1 page).
English language abstract of CN 1672884 (1 page).
English language abstract of CN 2677115 (1 page).
English language abstract of CN 1657244 (1 page).
English language abstract of CN 2417008 (1 page).

* cited by examiner

APPARENTLY SEAMLESS LENGTHENED BAMBOO SECTION MATERIAL AND A METHOD THEREOF

CROSS REFERENCE TO RELATED APPLICATIONS

The present application is a national stage application of International Application No. PCT/CN2008/071487, filed on Aug. 1, 2008. The PCT application claims priority to Chinese patent application No. 200710045737.5, filed on Sep. 7, 2007 and Chinese patent application No. 200810038705.7, filed on Jun. 6, 2008. The aforementioned PCT and Chinese patent applications are hereby incorporated by reference in their entirety.

FIELD OF THE INVENTION

The present invention relates to outdoor or indoor construction sheets and section materials, particularly relates to an apparently seamless lengthened sheet or section material made of bamboo, and a manufacturing method thereof.

BACKGROUND OF THE INVENTION

The superiority of bamboo-like texture and flavor has made bamboo a leading choice in the field of indoor and outdoor decoration where styles are simple, unsophisticated and elegant. Commonly, bamboo sheets used in building constructions such as floors or wall panels are made by gluing and then pressing bamboo strips or blanks together. In a common pressing process of bamboo strips or blanks after they have been glued, there are three main factors which should be adjusted according to different thickness or properties of the bamboo strips or blanks: temperature, pressure and pressing time.

Bamboo strip here means a raw bamboo slat cut by woodworking machinery at any length or width according to its utilizability; and bamboo blank here means a bamboo plate formed by gluing and pressing several bamboo strips together in direction of width or length. As the same as wood, the process of lengthening the bamboo strips or blanks is necessary for forming bamboo sheets of a large area. One traditional process of the lengthening is to make a groove at one end of a bamboo strip or blank and a corresponding tenon at one end of another bamboo strip or blank, then engage the groove and the tenon with each other. There are two primary shortcomings of this kind of connection. First, because the tenon is simply embedded into the groove, or at most, an adhesive is used in addition to the connecting, the transverse connecting strength is weak. Second, this kind of connection results in an unattractive seam between the two pieces where dust or dirt can easily be trapped inside and is difficult to remove.

Bamboo is one of the most abundant natural resources in China. Although the sheet or section materials made of bamboo or wood seem very similar, there are a lot of differences between them actually. Bamboo is unique for its hollow interior and its stem is the only thing that can be used to make the sheets. Furthermore, bamboo canes normally have a big bottom and a small top, and that makes the bottom part of the stem much thicker than the top part. Also, with its tubular structure and curved surface, bamboo is limited in the applications as sheets or section materials. Generally, after peeling off the outer surface layer and inner surface layer, a rectangular bamboo strip unit is only about 0.3-1.0 cm thick, 0.5-2.5 cm wide, and is almost unable to be used as a long length section material.

A traditional process for making the bamboo sheets is to agglutinate and then press the bamboo strips or blanks together. According to the different specifications of bamboo strips or blanks, as wells as the nature of the adhesive, different temperature, pressure and pressing time should be chosen carefully.

Moreover, the existing technology is limited to the manufacturing of bamboo sheets, and the process of making bamboo section materials has not been established. For its extraordinary characteristics such as high stability, non-deformation, high hardness and strength, short production circle, etc., bamboo can be made into a section material of any thickness, width or length, so as to achieve the purpose of replacing lumber or even steel.

DESCRIPTION OF THE INVENTION

One object of the present application is to provide an apparently seamless lengthened bamboo sheet made of lengthened bamboo strips or blanks, which is strong and stable after the bamboo strips or blanks are connected transversely.

Another object of the present application is to provide a manufacturing method for the apparently seamless lengthened bamboo sheet.

The solutions of the present application are:

An apparently seamless lengthened bamboo sheet is formed by lengthening a plurality of bamboo strips or blanks to form a lengthened bamboo strips or blanks, and then assembling a plurality of lengthened bamboo strips or blanks together. Each bamboo strip or blank is characterized in that a slot is formed on at least one end of each bamboo strip or blank in the direction of its length, and a tenon corresponding to the slot is formed on the seam end.

The tenon on one bamboo strip or blank is embedded into the slot on another bamboo strip or blank. The tenon and slot are mutually matched so that the two bamboo strips or blanks are engaged to each other. The cross-sectional shape of the slot and the tenon can be of any kind, such as S shape, Z shape, zigzag shape, tooth shape, and is not restricted to the above. However, the shape is preferably not too complicated, as a complicated shape may lead to difficulties in manufacturing.

The engagement of the slot and the tenon is that the shapes of the slot and the correspondingly formed tenon are suited to each other. In this way, the tenon can be perfectly embedded into the slot and completely fill in it, so that a flat bamboo sheet of a consistent thickness is naturally formed. Furthermore, as a plurality of bamboo strips or blanks, which are formed by the same slotting process, can be connected to each other directly, the manufacturing process is dramatically simplified.

An acute-angle inward incline is formed on an outer edge of the tenon, and a corresponding obtuse-angle outward incline is formed on an inner edge of the slot to match the incline of the tenon. This design has two remarkable effects: first, the inward incline makes it easier for any two bamboo strips or blanks being connected to each other. In other words, the tenon can be embedded into the slot more easily; second, the inward incline can perfectly cover a seam formed between the two bamboo strips or blanks. Thus the apparently seamless lengthened bamboo product can be achieved after gluing and pressing.

Two slots, one on each end of a bamboo strip or blank, may open to the same direction or opposite directions, and two tenons corresponding to the two slots are formed on the same end, respectively. The two slots can be formed from the upper or lower surface of a bamboo strip or blank, or even from a lateral surface.

Slots on a bamboo strip or blank being formed toward the same or opposite directions merely cause different ways of connecting two pieces. If to the same direction, the adjacent bamboo strips or blanks are engaged to each other in a "face up-face down" way. Or if to the opposite direction, the adjacent bamboo strips or blanks are engaged in a consistent way.

In order to guarantee the apparently seamless lengthened bamboo sheet from breaking caused by stress concentration, at least a part of the joints should be staggered when a plurality of lengthened bamboo strips or blanks are assembled to form a sheet.

To further ensure the strength of the bamboo sheet, any two adjacent joints should be staggered when a plurality of lengthened bamboo strips or blanks are assembled. For a bamboo sheet of a relatively small area, any two joints should not be on the same beeline.

The bamboo blank is formed by gluing and pressing bamboo strips in direction of width or thickness.

A method for manufacturing the apparently seamless lengthened bamboo sheet includes the following steps:

Step one: on at least one end in the direction of length of a bamboo strip or blank, forming a slot and a tenon, repeating the forming for at least one other bamboo strip or blank;

Step two: embedding a tenon on one bamboo strip or blank into a slot on another bamboo strip or blank, the tenons of two bamboo strips or blanks are engaged to each other, forming a lengthened bamboo strip or blank;

Step three: assembling and gluing a plurality of lengthened bamboo strips or blanks in direction of width or thickness;

Step four: forming a bamboo board by a common process including a pressing.

In the second step, an adhesive is spread on the interface of the two connecting tenons, in order to enhance the strength of the engagement.

Alternative to the above-mentioned acute-angle inward incline, an obtuse-angle outward incline may be formed on the outer edge of the tenon, and a corresponding acute-angle incline may be formed on the inner edge of the slot to match the outward incline of the tenon. The outward incline is an alternative form of the inward incline. From the perspective of process, there is no difference between the inward incline and the outward incline, although the assembly of the bamboo strips or blanks might be easier with the inward incline.

The cross-sectional shape of the slot and the tenon can be a S shape, a Z shape, a zigzag shape, a tooth shape, a paw shape or an irregular shape. The shape can be any kind and is not restricted to the above. Any bamboo strip or blank which has a pair of corresponding slot and tenon formed on one end should be considered within the scope of this application. The cross-sectional shape is preferably not to be too complicated; otherwise it may lead to difficulties in the process.

For a surface (normally the upper surface that is exposed to viewers) of the bamboo sheet to look like seamless, it is enough that the tenon formed from the upper surface has an inclined end. Correspondingly, the inner side of the slot also has an incline. It is not necessary for any tenon or slot formed from the lower surface (unexposed) to be inclined. However, at the connecting joint, it would be better to form inclines on the end sides of both tenons formed from upper and lower surfaces, and that will make the bamboo strip or blank longitudinally symmetrical and easier to manufacture.

Yet another object of the present application is to provide an apparently seamless lengthened bamboo section material. The bamboo section material is formed by lengthening, gluing and pressing a plurality of bamboo strips or blanks together in direction of length, width or thickness. The resulting bamboo section material can be in pillar shape, board shape, or any other shapes.

The apparently seamless lengthened bamboo section material is formed by lengthening a plurality of bamboo strips or blanks and assembling a plurality of lengthened bamboo strips or blanks together. The bamboo strips or blanks are closely engaged to each other in direction of their length by a pair of corresponding slot and tenon, and lengthened bamboo strips or blanks are orderly assembled to each other in directions of width and thickness, so as to form a bamboo section material of a certain size.

Under the premise of maximizing the usage of bamboo, the apparently seamless lengthened section material of this application has little requirement on the selection of bamboo material. It is recommended to use the bamboo strip units of highest exploiting rate, which are 10 to 200 cm long, 0.5 to 2.5 cm wide and 0.3 to 1.2 cm thick.

The phrase "closely engaged" means that a slot or a tenon is formed on at least one end of bamboo strips or blanks in direction of length, and the tenon of one bamboo strip or blank is embedded into the slot of another bamboo strip or blank in order to connect with each other. The interfaces of the tenon and slot are a pair of corresponding inward and outward inclines.

In an embodiment, at the same end of a bamboo strip or blank where a slot is formed, a tenon is formed corresponding to the slot, and the slot and tenon are mutually matched. Therefore, the tenon of a bamboo strip or blank can be embedded perfectly into the slot of another bamboo strip or blank. By connecting one bamboo strip or blank to another, a bamboo section of infinite length can be naturally formed.

Additionally, an acute-angle inward incline or an obtuse-angle outward incline is formed on the end edge of the tenon, and a corresponding incline is formed on the inner edge of the slot to match the incline of the tenon. This has two remarkable effects: first, the incline makes it easier for any two bamboo strips or blanks being connected to each other. In other words, the tenon can be embedded into the slot more easily; second, the incline can cover the seam formed between two bamboo strips or blanks very well. Thus the apparently seamless lengthened bamboo section material can be achieved after gluing and pressing.

To ensure a smooth and apparently seamless appearance, the inclines should be adopted at least on an exposed surface of the bamboo section material.

Slots being formed toward the same direction or opposite directions merely cause the different ways of connecting. If to the same direction, the adjacent bamboo strips or blanks are engaged to each other in a "face up-face down" way. Or if to the opposite direction, the adjacent bamboo strips or blanks are engaged in a consistent way.

The apparently seamless lengthened bamboo section material is made by assembling the bamboo strips or blanks in direction of length, width and thickness. A method for manufacturing the bamboo section material comprises the following steps:

Step one: forming a slot or a tenon on at least one end of bamboo strips or blanks. Spreading adhesive on the interface of the slot or tenon in order to engage two or more bamboo strips or blanks together continuously. Adhesive is also applied on the lateral side in direction of width and thickness of the bamboo strips and blanks.

The upper and lower surfaces of bamboo strips or blanks should be polished before glue-spreading, and after that, bamboo strips or blanks are ready for use when the adhesive is dry;

Step two: lengthening the bamboo strips or blanks by engaging their corresponding tenons and slots to each other to a designated length. Pressing a plurality of lengthened bamboo strips or blanks together in direction of width and thickness to a designated dimension. In an embodiment, a single layered sheet B is formed by pressing after a plurality of glued bamboo strips or blanks of same thickness are engaged, lengthened, and then regularly assembled in direction of thickness. And/or a single layered sheet A is formed by pressing after a plurality of glued bamboo strips or blanks of same width are engaged, lengthened, and then regularly assembled in direction of width;

Step three: stacking single layered sheet A and/or single layered sheet B which has adhesive on the surface to a designated size, and then forming the bamboo section material by one-time pressing or segmental pressings along its length.

In the third step, the stacking single layered sheet A and/or single layered sheet B to a designated size include: stacking two or more single layered sheets A together, or stacking two or more single layered sheets B together, or inserting a single layered sheet A between two single layered sheets B, or inserting a single layered sheet B between two single layered sheets A.

The means of pressing are as follows:

One-time pressing: stacking two or more single layered sheets A together, or stacking two or more single layered sheets B together, or inserting a single layer sheet A between two single layered sheets B, or inserting a single layer sheet B between two single layer sheets A, and then pressing the stacked layers to form a bamboo section material by a press machine; or Two-time pressing: spreading adhesive on the upper and/or lower surface of the one-time pressed bamboo section material, stacking single layered sheet(s) A or B on the upper and/or the lower surface of the one-time pressed bamboo section material, and then pressing for a second time by a press machine; or Multiple-time pressing: repeating the two-time pressing until a designated size is reached.

Furthermore, one-time pressing is to stack three or more single layered sheets A and/or single layered sheets B together, and then pressing the stacked sheets by the press machine to form a bamboo section material of within 150 mm thick.

Hot-pressing is a technique in which a heated press plate is used to transfer heat to the internal of the material and adhesive under pressing, so that the adhesive will be cured and the materials will be glued together. Also, hot-pressing can be used for two-time pressing or multiple-time pressing to form multi-layered section material of a certain thickness. The process is to level and polish the surface of a single layered sheet at first, then to spread adhesive on the polished surface, and after stacking a plurality of the single layered sheets together, hot-pressing is carried out. This kind of hot-pressing process has the advantages of faster heat propagation, shorter glue curing time, no negative influence on both internal bonding strength of the adhesive, etc. so that the resulting products have a high quality and good performance.

In comparison, glue curing by traditional hot-pressing method cannot be used for products above a certain thickness, because the bonding strength is weak and the products are of low quality.

Under the method of this application, one-time pressing is enough for bamboo section materials within 150 mm thick; and two-time or multiple-time pressing is required for bamboo section materials more than 150 mm thick. Thus, this method can be applied in producing apparently seamless lengthened bamboo section material of 10 to 1000 mm thick, 10 to 1300 mm wide, and any length.

The "pressing" refers to hot-pressing, in which the temperature is 85 to 165 Celsius, and the pressure is 5 to 35 kg/cm$^2$.

The "stacking" refers to two or more single layered sheets being stacked one on top of another concurrently or crisscross.

As bamboo may get moldy faster than wood, an anti-mildew treatment needs to be done to raw bamboo before producing the bamboo section material. The anti-mildew treatment is preferably a carbonization process, including water carbonization, wet carbonization or dry carbonization of the bamboo strips or blanks before lengthening.

The adjacent joints should be staggered when lengthened bamboo strips or blanks are assembled in direction of thickness and/or width.

The bamboo section material manufactured by the above method can be used as outdoor pillar, girder, railing, platform deck, platform flooring, outdoor or indoor flooring, truck sheet, ship floor, container panel, building board, etc. They can be used to replace any wood-based products or lumber products in building constructions.

The above-described bamboo blanks also include similarly pressed materials made of bamboo treads or sawalis.

The beneficial effects of the present invention are:

1. The apparently seamless lengthened bamboo sheet has a novel slot-tenon connecting structure which makes a seam between two adjacent bamboo strips or blanks appear unobvious on the surface of the sheet;

2. The connecting structure enhances the strength of the transverse connection;

3. The manufacturing method improves the utilization ratio of the bamboo material, adds values to the product, while protects bamboo natural resources;

4. The static bending strength, hardness and other mechanical properties of the apparently seamless lengthened bamboo section material are the same as the regular bamboo sheet, but the deformation degree drops down remarkably;

5. This application solves the long-time length limitation problem for bamboo products such as flooring, furniture panel, outdoor deck, garden planks, building material, etc. realizing the potential of replacing wood or even steel with the bamboo;

6. In the novel slot-tenon connecting structure, an acute-angle or obtuse-angle incline is formed on the end edge of the tenon. The incline not only provides the product with an apparently seamless surface after gluing and pressing together, but also enhances the transverse strength. The product's stability is enhanced dramatically;

7. The structure improves the utilization ratio of bamboo material, adds values to the bamboo product, while protecting natural bamboo resources; and 8. The bamboo section material, including pillar, girder, railing, platform deck and flooring, can be of any length, width and thickness as required. The bamboo section material is of high intensity, hardness and low deformation degree, and the products can replace wood or even steel.

REFERENCE NUMBERS IN THE FIGURES

Figure 1:
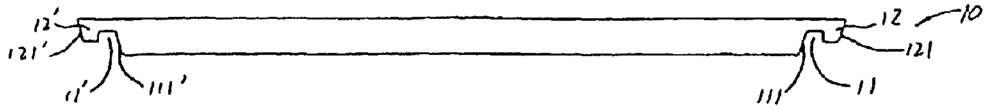
FIG. 1 is a cross-sectional view a bamboo strip or blank where a slot and a tenon are formed on each end and face same direction, according to the present invention.

10, 10', 20, 20', 30, 50, 50', 60, 60', 70, 70', 80, 80'—bamboo strip or blank
11, 11', 21, 21', 31, 51, 51'—slot
111, 111', 511, 511'—incline of slot
12, 12', 22, 22', 32, 52, 52'—tenon
121, 121', 521, 521'—incline of tenon
40—joint
90, 91—single layered sheet B
100, 101, 102, 103, 104—single layered sheet A

DETAILED IMPLEMENTATION OF THE INVENTION

The invention is further explained through the following examples in conjunction with the figures.

Example 1

Figure 3:
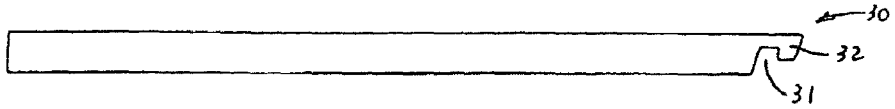
FIG. 3 is a cross-sectional view of a bamboo strip or blank where a and a tenon are formed on only one end, according to the present invention.

Referring to FIG. 1 and FIG. 3, an apparently seamless lengthened bamboo sheet is formed by assembling and lengthening a plurality of bamboo strips or blanks 10 together. A bamboo strip or blank 30 is used at the end to terminate the sheet. A slot 31 is formed on one end of the bamboo strip or blank 30 in direction of length, and a tenon 32 corresponding to the slot 31 is formed on the same end.

Two slots 11, 11', which face the same direction are formed on both ends of the bamboo strip or blank 10, and two tenons 12, 12', corresponding to the slots 11, 11', are formed on the same end, respectively.

On the same end of bamboo strip or blank 10, the slots 11, 11' and the correspondingly formed tenons 12, 12' are mutually matched to each other.

Acute-angle inclines 121, 121' are formed on both end edges of the tenons 12, 12', and corresponding obtuse-angle inclines 111, 111' are formed on the inner edges of the slots 11, 11'.

Figure 4:
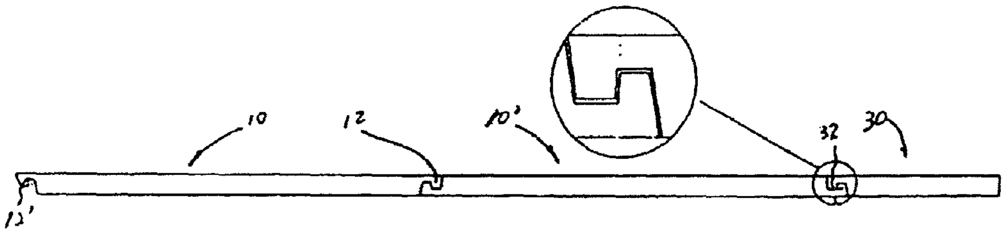
FIG. 4 shows the connecting structure of a lengthened bamboo strip or blank, according to the present invention.

Referring to FIG. 4, adjacent bamboo strips or blanks 10 are engaged to each other in a "face up-face down" way. The tenon 12 on the bamboo strip or blank 10 is embedded into the slot on another bamboo strip or blank 10', the tenon 12 and slot are mutually matched and the two tenons are engaged to each other. The tenon 32 of end bamboo strip or blank 30 is embedded into the slot on bamboo strip or blank 10', the tenon 32 and slot are mutually matched and the two tenons are engaged to each other. A flat bamboo sheet is formed in this way.

Figure 5:
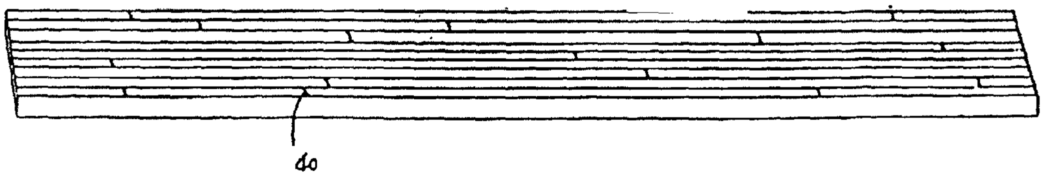
FIG. 5 shows an apparently seamless lengthened bamboo sheet, according to the present invention.

Referring to FIG. 5, any two adjacent joints 40 should be staggered when a plurality of lengthened bamboo strips or blanks are assembled to form a sheet.

A method to manufacture the apparently seamless lengthened bamboo sheet includes the following steps:

Step one: forming a slot on at least one end of bamboo strips or blanks in direction of length, a tenon is formed on the same end corresponding to the slot;

Step two: embedding the tenon on one bamboo strip or blank into the slot on another bamboo strip or blank. The tenons of two bamboo strips or blanks are engaged to each other, while adhesive is spread on the interfaces, forming lengthened bamboo strips or blanks;

Step three: assembling and gluing a plurality of the lengthened bamboo strips or blanks together in direction of width or thickness; and Step four: forming a bamboo sheet by a common process including pressing. The specific process is: under the pressure of 10 to 30 $kg/cm^2$, temperature of 110 to 150 Celsius (cold-pressing is also feasible), pressing time of 5 to 30 minutes, a plurality of bamboo strips or blanks are combined together to form an apparently seamless lengthened bamboo sheet.

Example 2

Figure 2:
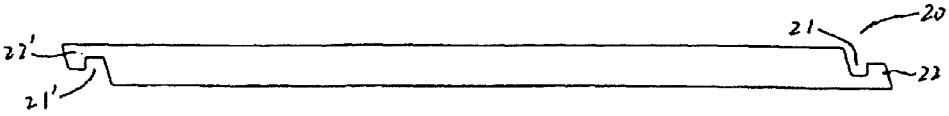
FIG. 2 is a cross-sectional view of a bamboo strip or blank where a slot and a tenon are formed on each end and face opposing directions, according to the present invention.

Referring to FIG. 2, two slots 21, 21' are formed on both ends of a bamboo strip or blank 20, and two tenon 22, 22' corresponding to the slot 21, 21' are formed on the same end.

The two slots 21, 21' are formed to the opposite direction, and the adjacent bamboo strips or blanks should be engaged in a consistent way. Any other structure is the same as example 1.

Example 3

Figure 6:
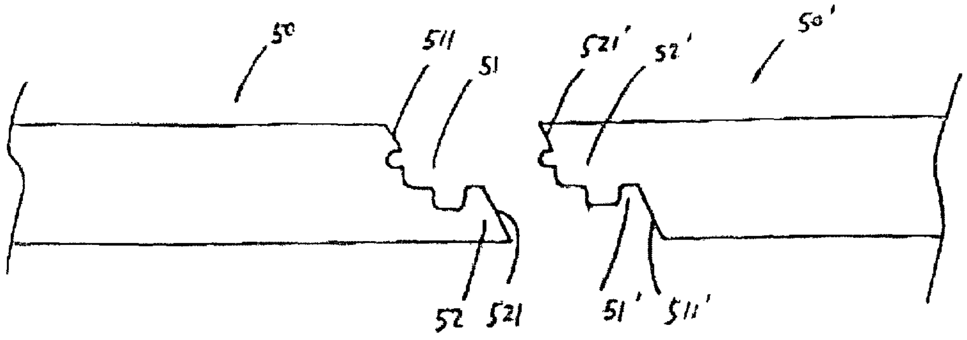
FIG. 6 is a cross-sectional view of a slot-and-tenon connection pattern between two bamboo strips or blanks, as described in example 3 of the present application.

Referring to FIG. 6, the cross-sectional shape of a tenon 52' formed on a bamboo strip or blank 50', and the cross-sectional shape of a slot 51 formed on a bamboo strip or blank 50 are both in a paw shape. A slot 51' is formed corresponding to the tenon 52', and a tenon 52 is formed corresponding to the slot 51. Inward inclines 521, 521' are formed on the end sides of the tenons 52, 52', and correspondingly inclines 511, 511' are formed on the inner sides of the slots 51, 51'. All other structures are the same as example 1.

Example 4

Figure 7:
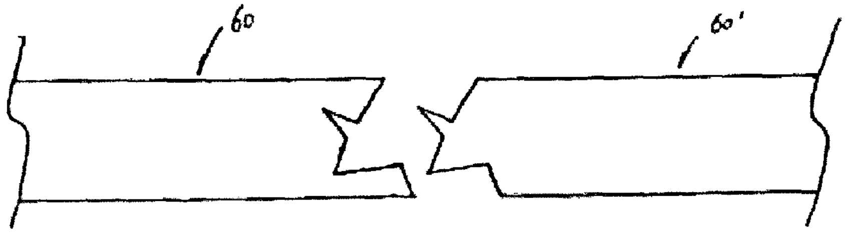
FIG. 7 is a cross-sectional view of a slot-and-tenon connection pattern between two bamboo strips or blanks, as described in example 4 of the present application.

Referring to FIG. 7, the cross-sectional shape of bamboo strips or blanks 60, 60' are both in a Z shape. All other structures are the same as example 1.

Example 5

Figure 8:
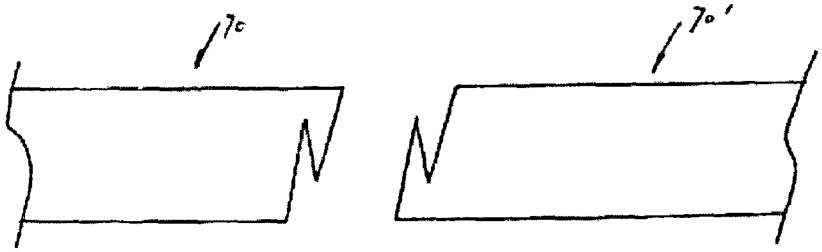
FIG. 8 is a cross-sectional view of a slot-and-tenon connection pattern between two bamboo strips or blanks, as described in example 5 of the present application.

Referring to FIG. 8, the cross-sectional shapes of bamboo strips or blanks 70, 70' are both in a tooth shape. All other structures are the same as example 1.

Example 6

Figure 9:
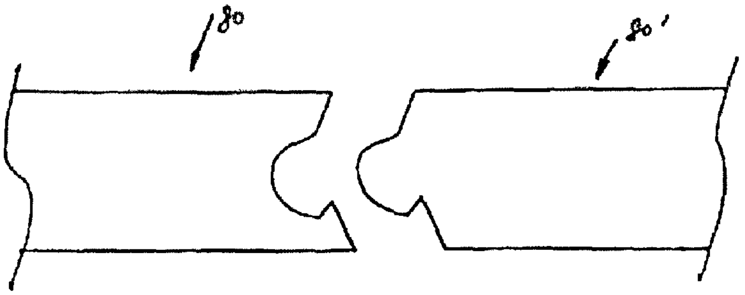
FIG. 9 is a cross-sectional view of a slot-and-tenon connection pattern between two bamboo strips or blanks, as described in example 6 of the present application.

Referring to FIG. 9, the cross-sectional shapes of bamboo strips or blanks 80, 80' are both in an irregular shape. All other structures are the same as example 1.

An apparently seamless lengthened bamboo section material is formed by assembling and lengthening a plurality of bamboo strips or blanks together. The bamboo strips or blanks are closely engaged to each other in direction of length by a pair of corresponding slot and tenon, and assembled to each other in direction of width and thickness, so as to form a bamboo section material of a certain size.

The phrase "closely engaged" means that a slot and/or a tenon is formed on at least one end of bamboo strips or blanks in direction of length, and the tenon of one bamboo strip or blank is embedded into the slot of another bamboo strip or blank in order to connect with each other. The interfaces of the tenon and slot are a pair of corresponding inward (acute-angle) and outward (obtuse-angle) inclines.

Figure 10:
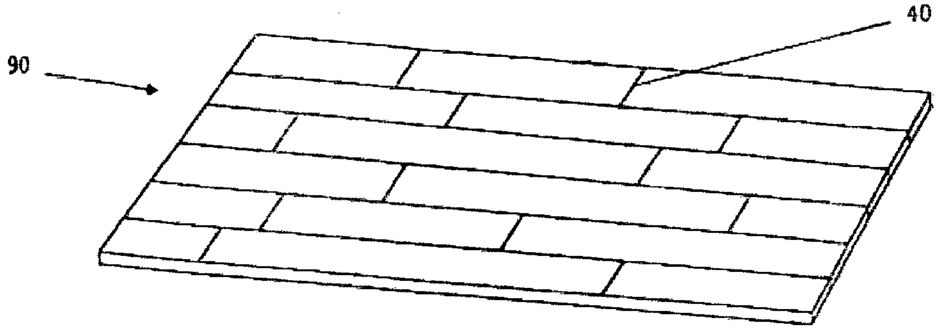
FIG. 10 shows a single-layered bamboo sheet B in which a plurality of lengthened bamboo strips or blanks are arranged width by width (horizontally).
Figure 11:
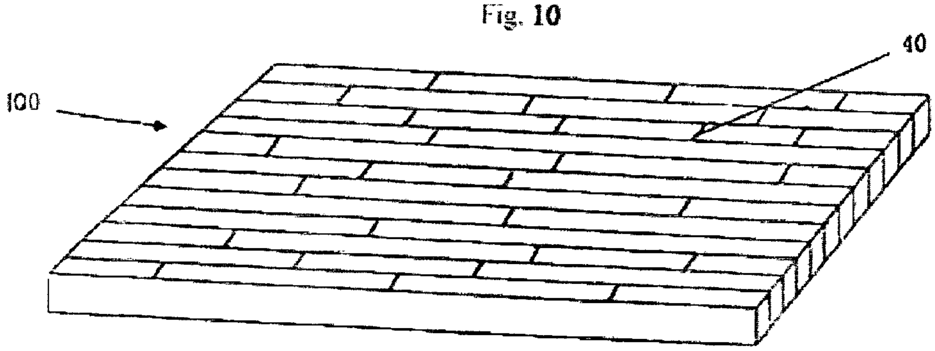
FIG. 11 shows a single-layered bamboo sheet A in which a plurality of lengthened bamboo strips or blanks are arranged thickness by thickness (vertically).

Prior to manufacturing the apparently seamless lengthened bamboo section material, a carbonization process, which including one of water carbonization, wet carbonization and dry carbonization, is performed to raw bamboo strips or blanks. After that, the bamboo strips or blanks are assembled in direction of length, width and thickness. The manufacturing method includes the following steps:

Step one: Referring to FIG. 1, forming two slots 11, 11' on both ends of bamboo strips or blanks 10, corresponding to the slots 11, 11' two tenons 12, 12' are formed on the same end, and the two slots 11, 11' are formed to the same direction; on the same end of the bamboo strip or blank 10, the slots 11, 11' and the correspondingly formed tenons 12, 12' are mutually matched to each other; inward inclines 121, 121' are formed on both end sides of the tenons 12, 12', and corresponding inclines 111, 111' are formed on the inner sides of the slots 11, 11'. Spreading adhesive on the interfaces of the slots and tenons, as well as on the lateral side of bamboo strips and blanks in direction of width and thickness. The glued bamboo strips or blanks are ready for use when the adhesive is dry;

Step two: lengthening the bamboo strips or blanks by engaging their corresponding tenons and slots to each other as shown in FIG. 3. The adjacent bamboo strip or blank 10, 10' should be engaged in a "face up-face down" way. The tenon 12 on one bamboo strip or blank 10 is embedded into the slot 11' on another bamboo strip or blank 10', the tenon 12 and slot 11' are mutually matched. Adhesive is spread on the slot or tenon. In this way, two or more bamboo strips or blanks are engaged to each other to a designated length;

Pressing a plurality of bamboo strips or blanks together in direction of width and thickness to a designated dimension. Referring to FIG. 10, a single layered sheet B 90 is formed by pressing after a plurality of glued bamboo strips or blanks of same thickness are engaged, lengthened, and regularly assembled in direction of thickness. And/or, referring to FIG. 11, a single layered sheet A 100 is formed by pressing after a plurality of glued bamboo strips or blanks of same width are engaged, lengthened, and regularly assembled in direction of width; the hot-pressing temperature is 85 to 165 Celsius, and the pressure is 5 to 35 $kg/cm^2$. Any two adjacent joints 40 should be staggered when a plurality of lengthened bamboos strip or blanks are assembled. The upper and lower surfaces of bamboo strips or blanks should be polished before glue-spreading, and after that, bamboo strips or blanks are ready for use when the adhesive is dry;

Step three: Stacking single layered sheet A and/or single layered sheet B which has adhesive on the surface to designated size, and then forming a bamboo section material by one-time pressing or segmental pressing along its length.

Example 7

Figure 12:
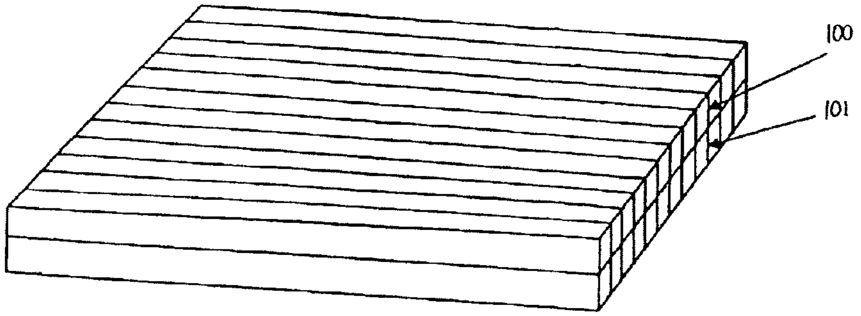
FIG. 12 shows the bamboo section material as described in example 7 of the present application.

Referring to FIG. 12, two single layered sheets A 100, 101 are stacked together which are concurrent to each other. A bamboo section material is formed by hot-pressing from the lateral side, in which the temperature is 85 to 165 Celsius, and the pressure is 5 to 35 $kg/cm^2$.

Example 8

Figure 13:
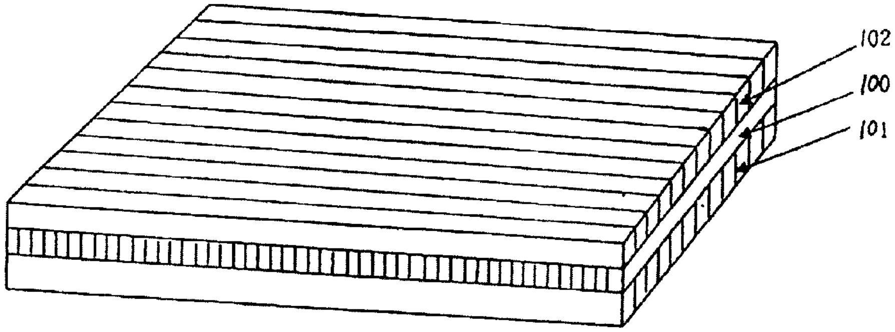
FIG. 13 shows the bamboo section material as described in example 8 of the present application.

Referring to FIG. 13, three single layered sheets A 100, 101,102 are stacked together which are crisscross to each other. A bamboo section material is formed by hot-pressing from the lateral side, in which the temperature is 85 to 165 Celsius, and the pressure is 5 to 35 $kg/cm^2$.

Example 9

Figure 14:
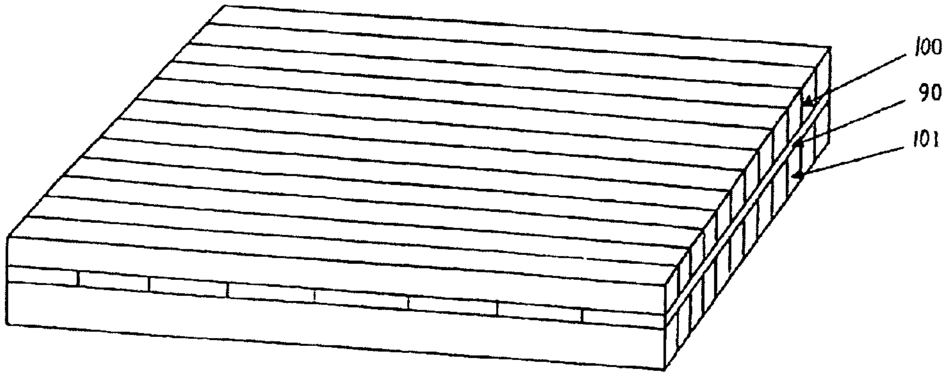
FIG. 14 shows the bamboo section material as described in example 9 of the present application.

Referring to FIG. 14, a single layered sheet B 90 is inserted between two single layered sheets A 100, 101, and the three single layers are crisscross to each other. A bamboo section material is formed by hot-pressing from the lateral side, in which the temperature is 85 to 165 Celsius, and the pressure is 5 to 35 $kg/cm^2$.

Example 10

Figure 15:
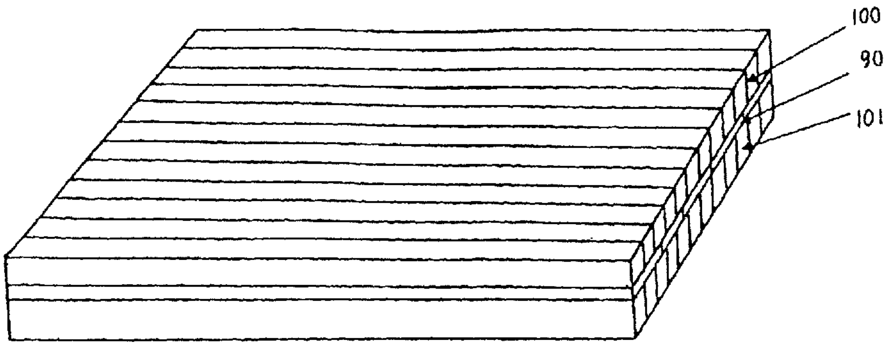
FIG. 15 shows the bamboo section material as described in example 10 of the present application.

Referring to FIG. 15, a single layered sheet B 90 is inserted between two single layers A 100, 101, and the three single layers are concurrent to each other. A bamboo section material is formed by hot-pressing from the lateral side, in which the temperature is 85 to 165 Celsius, and the pressure is 5 to 35 kg/cm$^2$.

Example 11

Figure 16:
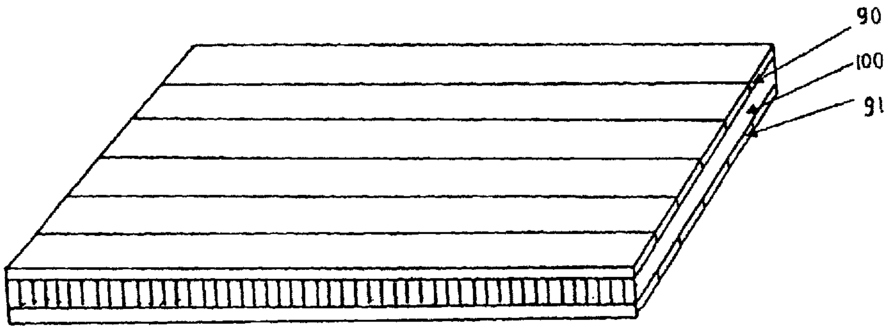
FIG. 16 shows the bamboo section material as described in example 11 of the present application.

Referring to FIG. 16, a single layered sheet A 100 in inserted between two single layered sheets B 90, 91, and the three single layers are crisscross to each other. A bamboo section material is formed by hot-pressing from the upper side, in which the temperature is 85 to 165 Celsius, and the pressure is 5 to 35 kg/cm$^2$.

Example 12

Figure 17:
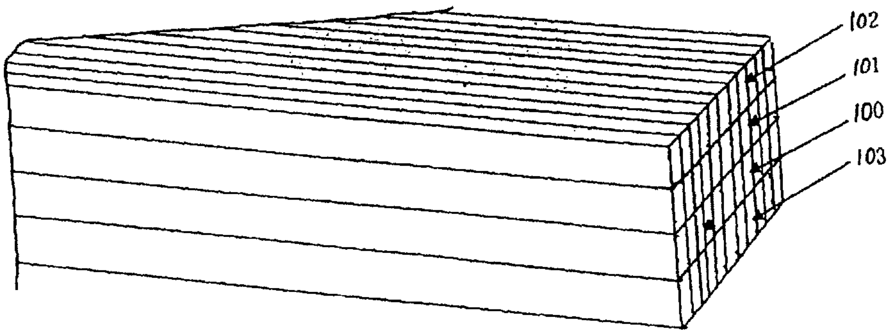
FIG. 17 shows the bamboo section material as described in example 12 of the present application.

Referring to FIG. 17, two single layered sheets A 100, 101 are stacked together which are concurrently to each other. A bamboo section material is formed by a one-time hot-pressing from the lateral side, in which the temperature is 85 to 165 Celsius, and the pressure is 5 to 35 kg/cm$^2$.

Spreading adhesive on both upper and lower surfaces of the one-time pressed bamboo section material 100/101, and then stacking two single layered sheets A 102, 103 to both surfaces respectively. The single layered sheets A 102, 103 and the one-time pressed bamboo section material 100/101 are concurrent to each other. A bamboo section material is formed by a two-time hot-pressing from the lateral side, in which the temperature is 85 to 165 Celsius, and the pressure is 5 to 35 kg/cm$^2$.

Example 13

Figure 18:
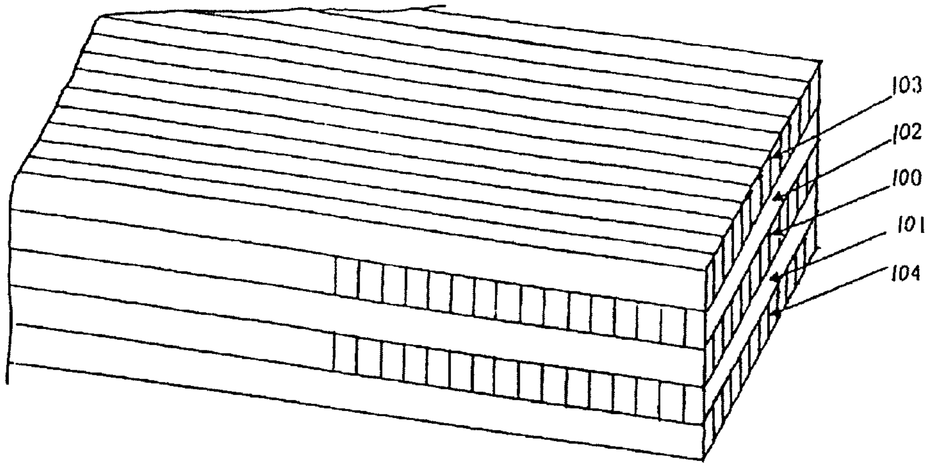
FIG. 18 shows the bamboo section material as described in example 13 of the present application.

Referring to FIG. 18, three single layered sheets A 100, 101,102 are stacked together which are crisscross to each other. A bamboo section material 102/100/101 is formed by hot-pressing from the lateral side, in which the temperature is 85 to 165 Celsius, and the pressure is 5 to 35 kg/cm$^2$.

Spreading adhesive on both upper and lower surfaces of the one-time pressed bamboo section material 102/100/101, and then stacking two single layered sheets A 103, 104 to both surfaces respectfully. The single layered sheets A 103, 104 and the one-time pressed bamboo section material 102/100/101 are crisscross to each other. A bamboo section material is formed by a two-time hot-pressing, in which the temperature is 85 to 165 Celsius, and the pressure is 5 to 35 kg/cm$^2$.

Example 14

Figure 19:
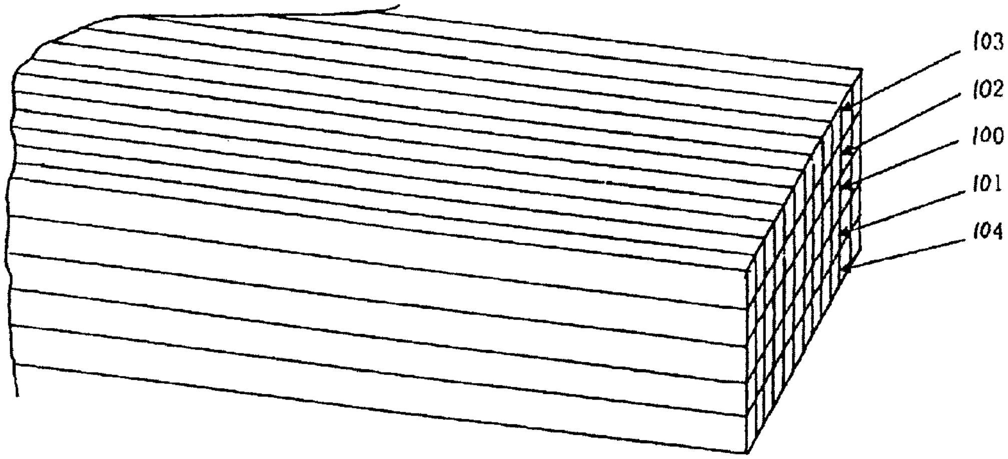
FIG. 19 shows the bamboo section material as described in example 14 of the present application.

Referring to FIG. 19, spreading adhesive on the surfaces of five single layered sheets A 100, 101, 102, 103, 104, and the five single layered sheets A are stacked crisscross to each other. Forming a bamboo section material within 150 mm thick by hot-pressing from the lateral side, in which the temperature is 85 to 165 Celsius, and the pressure is 5 to 35 kg/cm$^2$.

Example 15

Figure 20:
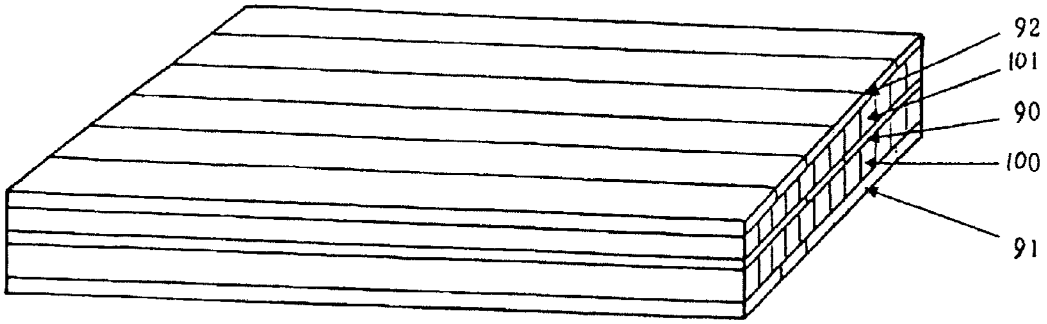
FIG. 20 shows the bamboo section material as described in example 15 of the present application.

Referring to FIG. 20, inserting a single layered sheet B 90 between two single layered sheets A 100, 101, and the three single layers are concurrent to each other. Forming a one-time pressed bamboo section material 101/90/100 by a hot-pressing from the lateral side, in which the temperature is 85 to 165 Celsius, and the pressure is 5 to 35 kg/cm$^2$.

Spreading adhesive on both upper and lower surfaces of the one-time pressed bamboo section material 101/90/100, and then stacking two single layered sheets B 91, 92 to both surfaces respectively. The single layers and the one-time pressed bamboo section material are crisscross to each other. Forming a two-time pressed bamboo section material by a hot-pressing from the upper side, in which the temperature is 85 to 165 Celsius, and the pressure is 5 to 35 kg/cm$^2$.

Example 16

Figure 21:
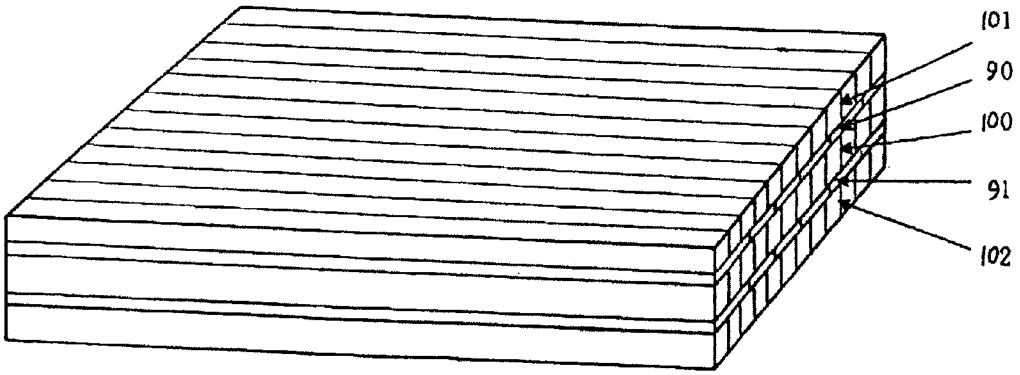
FIG. 21 shows the bamboo section material as described in example 19 of the present application.

Referring to FIG. 21, inserting a single layered sheet A 100 between two single layered sheets B 90, 91, and the three single layers are concurrent to each other.

Forming a bamboo section material 90/100/91 by hot-pressing from the upper side, in which the temperature is 85 to 165 Celsius, and the pressure is 5 to 35 kg/cm$^2$.

Spreading adhesive on both upper and lower surfaces of the one-time pressed bamboo section material, and then stacking two single layered sheets A 101, 102 to both surface respectively. The single layers and the one-time pressed bamboo section material are concurrent to each other. Forming a two-time pressed bamboo section material by a hot-pressing from the lateral side, in which the temperature is 85 to 165 Celsius, and the pressure is 5 to 35 kg/cm$^2$.

What is claimed is:

1. A substantially seamless lengthened bamboo sheet, formed by lengthening a plurality of bamboo strips or blanks and assembling a plurality of lengthened bamboo strips or blanks together, the sheet comprising a first sheet surface defining a first plane and an opposing second sheet surface defining a second plane, said sheet is characterized by:

a slot is formed on at least one end of each bamboo strip or blank, and a tenon corresponding to the slot is formed on the same end, wherein the slot and the tenon are located at said one end in locations distributed in the direction of length of said each bamboo strip or blank with the slot located inward from the tenon;

wherein said slot and said tenon are mutually matched in shape, and the tenon on one bamboo strip or blank is embedded into the slot on another bamboo strip or blank at a joint for forming a lengthened bamboo strip or blank, and wherein the shapes of the tenon and the slot are such that an acute-angle inward incline is formed on an end edge of said tenon, and a corresponding incline is formed on an inner edge of said slot to match said inward incline of the tenon, the incline on the tenon arranged to meet the first sheet surface on the first plane at a first acute angle and the incline on the slot arranged to meet the second sheet surface on the second plane at a second acute angle, and wherein the slot and the tenon are shaped to prevent the joint from disengagement along the direction of said length.

2. The bamboo sheet of claim 1, wherein on the same end of a bamboo strip or blank, the shape of said slot and the shape of said tenon are suited to each other, wherein the slot and the tenon are shaped such that said assembling comprises joining the strips or blanks at the joint in a direction substantially perpendicular to the first plane.

3. The bamboo sheet of claim 1, wherein two slots, one on each end of a bamboo strip or blank, are formed, said two slots are open toward a same direction or open toward opposite directions, and wherein two tenons corresponding to said two slots are formed on the same ends respectively.

4. The bamboo sheet of claim 1, wherein the plurality of the lengthened bamboo strips or blanks are arranged such that at least a part of joints between two bamboo strips or blanks are staggered when the sheet is formed.

5. The bamboo sheet of claim 4, wherein the plurality of the lengthened bamboo strips or blanks are arranged such that any two adjacent joints are staggered when the sheet is formed.

6. The bamboo sheet of claim 1, wherein a bamboo blank is formed by gluing and pressing one or more bamboo strips from the direction of width or thickness.

7. The bamboo sheet of claim 1, wherein a cross-sectional shape of the tenon and/or the slot is a S shape, a Z shape, a zigzag shape, a tooth shape, a paw shape or an irregular shape.

8. A substantially seamless lengthened bamboo section material, formed by lengthening a plurality of bamboo strips or blanks and assembling a plurality of lengthened bamboo strips or blanks together, the section material comprising first surface defining a first plane and an opposing second surface defining a second plane, wherein said bamboo strips or blanks are closely engaged to each other in direction of length by a pair of corresponding slot and tenon at a joint, wherein the slot and the tenon in each pair are located at least one end of each bamboo strip or blank in locations distributed in the direction of said length with the slot located inward from the tenon, and the lengthened bamboo strips or blanks are assembled in directions of width and thickness, so as to form the bamboo section material in certain dimensions, wherein the shapes of the tenon and the slot are such that an acute-angle inward incline is formed on an end edge of said tenon, and a corresponding incline is formed on an inner edge of said slot to match said inward incline of the tenon, the incline on the tenon arranged to meet the first surface on the first plane at a first acute angle and the incline on the slot arranged to meet the second surface on the second plane at a second acute angle, and wherein the slot and the tenon are shaped to prevent the joint from disengagement along the direction of said length.

9. The bamboo section material of claim 8, wherein the “closely engaged” means that a slot or a tenon is formed on at least one end of the bamboo strips or blanks in direction of length, and said tenon of one bamboo strip or blank is embedded into said slot of another bamboo strip or blank in order to connect the two bamboo strips or blanks with each other, and wherein a pair of corresponding inward and outward inclines are formed at the interface between the two bamboo strips or blanks.

10. A method for manufacturing a substantially seamless lengthened bamboo sheet by lengthening a plurality of bamboo strips or blanks and assembling a plurality of lengthened bamboo strips or blanks together, the sheet comprising a first sheet surface defining a first plane and a second sheet surface defining a second plane, said method comprising:

forming a slot on at least one end of each bamboo strip or blank, and a tenon on the same end corresponding to said slot, wherein the slot and the tenon are located at said one end in locations distributed in the direction of length of said each bamboo strip or blank with the slot located inward from the tenon;

forming a lengthened bamboo strip or blank by embedding said tenon on one bamboo strip or blank into said slot on another bamboo strip or blank at a joint, wherein the tenons of two bamboo strips or blanks are engaged to each other, wherein the shapes of the tenon and the slot are such that an acute-angle inward incline is formed on an end edge of said tenon, and a corresponding incline is formed on an inner edge of said slot to match said inward incline of the tenon, the incline on the tenon arranged to meet the first sheet surface on the first plane at a first acute angle and the incline on the slot arranged to meet the second sheet surface on the second plane at a second acute angle, and wherein the slot and the tenon are shaped to present joint from disengagement direction of said length;

assembling and gluing a plurality of lengthened bamboo strips or blanks in direction of width or thickness of the lengthened bamboo strips or blanks and forming the bamboo sheet by a process that includes a pressing.

11. The method of claim 10, wherein an adhesive is applied on interfaces between the two connecting tenons.

12. A method for manufacturing a substantially seamless lengthened bamboo section material formed by lengthening a plurality of bamboo strips or blanks and assembling a plurality of lengthened bamboo strips or blanks together, the section material comprising a first surface defining a first plane and an opposing second surface defining a second plane, said method comprising:

forming a slot and a tenon on at least one end of each bamboo strip or blank, wherein the slot and the tenon are located at said at least one end in locations distributed in the direction of length of said each bamboo strip with the slot located inward from the tenon, wherein the shapes of the tenon and the slot are such that an acute-angle inward incline is formed on an end edge of said tenon, and a corresponding incline is formed on an inner edge of said slot to match said inward incline of the tenon, the incline on the tenon arranged to meet the first surface on the first plane at a first acute angle and the incline on the slot arranged to meet the second surface on the second plane at a second acute angle, wherein the tenon on one bamboo strip or blank is arranged to embed into the slot on another bamboo strip or blank at a joint;

spreading an adhesive on the surfaces of said slots or tenons, the lateral sides in direction of width and thickness, and upper and lower surfaces of the bamboo strips or blanks, wherein the upper and lower surfaces of the bamboo strips or blanks are polished before the adhesive-spreading, and the adhesive is dried before the next step;

lengthening said bamboo strips or blanks by engaging their corresponding tenons and slots to each other to a designated length, and wherein the slot and the tenon are shaped to prevent the joint from disengagement along the direction of said length, pressing together a plurality of lengthened bamboo strips or blanks in direction of width or thickness to form a single layered bamboo sheet, wherein a single layered sheet B is formed by pressing a plurality of glued and lengthened bamboo strips or blanks of same thickness and assembled in direction of thickness, and a single layered sheet A is formed by pressing a plurality of glued and lengthened bamboo strips or blanks of same width and assembled in direction of width;

stacking one or more single layered sheets A and/or single layered sheets B which have adhesive on the surfaces to a designated size, and then forming the bamboo section material by one-step pressing or segmental pressing along its length.

13. The method of claim 12, wherein stacking the single layered sheets A and/or the single layered sheets B to a designated size comprises:

stacking two or more single layered sheets A together, or
stacking two or more single layered sheets B together, or
inserting a single layered sheet A between two single layered sheets B, or
inserting a single layered sheet B between two single layered sheets A.

14. The methods of claim 12, wherein the one-step pressing or segmental pressing includes one of the following processes:

one-time pressing: stacking two or more single layered sheets A together, or stacking two or more single layered sheets B together, or inserting a single layered sheet A between two single layered sheets B, or inserting a single layered sheet B between two single layered sheets A, and then pressing said stacked single layered sheets to form the bamboo section material by a press machine; or two-time pressing: after one-time pressing, spreading adhesive on the upper and/or lower surface of said one-time pressed bamboo section material, adding single layered sheet(s) on the upper and/or the lower surface of said one-time pressed bamboo section material, and then pressing for a second time by the press machine; or multiple-time pressing: after one-time pressing, repeating said spreading adhesive, adding single layered sheet(s) and pressing until a designated size is reached.

15. The methods of claim 14, wherein said one-time pressing is to stack three or more single layered sheets A and/or single layered sheets B together, and then press said stacked sheets by press machine to form the bamboo section material of within 150 mm thick.

16. The methods of claim 12, wherein said "pressing" refers to hot-pressing, in which the temperature is 85 to 165 Celsius, and the pressure is 5 to 35 $kg/cm^2$.

17. The methods of claim 12, wherein said "stacking" refers to two or more single layered sheets being stacked one to another concurrently or crisscross.

18. The methods of claim 12, wherein an anti-mildew treatment is performed to the bamboo strips or blanks before producing the bamboo section material, and said anti-mildew treatment is a carbonization process including water carbonization, wet carbonization or dry carbonization before the bamboo strips or blanks are lengthened.

* * * * *

UNITED STATES PATENT AND TRADEMARK OFFICE

CERTIFICATE OF CORRECTION

PATENT NO. : 8,268,431 B2
APPLICATION NO. : 12/449754
DATED : September 18, 2012
INVENTOR(S) : Gao et al.

It is certified that error appears in the above-identified patent and that said Letters Patent is hereby corrected as shown below:

On the title page of the patent, item 75 "Inventors", Younhui Gao, Shanghai "(CA)", should be changed to Yonghui Gao, Shanghai --(CN)--.

Signed and Sealed this
Fourth Day of March, 2014

Michelle K. Lee
*Deputy Director of the United States Patent and Trademark Office*